United States Patent [19]

Nagahara et al.

[11] Patent Number: 5,136,567
[45] Date of Patent: Aug. 4, 1992

[54] PHOTO-DETECTING DEVICE

[75] Inventors: Shinichi Nagahara; Naoharu Yanagawa; Takaaki Matsumoto, all of Saitama, Japan

[73] Assignee: Pioneer Electronic Corporation, Tokyo, Japan

[21] Appl. No.: 704,159

[22] Filed: May 22, 1991

[30] Foreign Application Priority Data

Jun. 27, 1990 [JP] Japan .................................. 2-166626

[51] Int. Cl.$^5$ .............................................. G11B 7/00
[52] U.S. Cl. .................................................. 369/44.41
[58] Field of Search ............... 369/44.41, 44.42, 44.38, 369/44.26, 44.34, 44.35, 47, 109, 120, 44.27, 44.29, 44.31, 44.32, 44.33, 44.36, 54, 58, 105, 44.23

[56] References Cited
U.S. PATENT DOCUMENTS 4,544,838 10/1985 Musha et al. .................... 369/44.34

FOREIGN PATENT DOCUMENTS 0143441 7/1985 Japan ................................. 369/44.41

Primary Examiner—Roy N. Envall, Jr.
Assistant Examiner—Hung Dang
Attorney, Agent, or Firm—Sughrue, Mion, Zinn Macpeak & Seas

[57] ABSTRACT

The light receiving surface of the light receiving element, which receives reflected light from an information recorded disc, is divided into sections along lines passing through the center of the surface which run parallel to and perpendicular to the direction of tracking and which also run at an angle of 45 degrees to the first two lines. The tracking errors are detected either by a push-pull method or a heterodyne method. The two methods are combined and alternately switched into operation depending on whether information is being written into or read from the information recording disc. The push-pull method uses a pair of opposing, divided light receiving surfaces disposed in the direction of tracking and the heterodyne method uses two pairs of opposing, divided surfaces disposed diagonally or at an angle of 45 degrees to the direction of tracking.

6 Claims, 2 Drawing Sheets

PHOTO-DETECTING DEVICE

BACKGROUND OF THE INVENTION

The present invention relates to a photo-detecting device which uses two different methods of detecting tracking errors, one for unrecorded portions and the other for recorded portions in an information recorded disc, which contains unrecorded portions that can be recorded with data and information recorded portions.

PRIOR ART

A push-pull method and a heterodyne method are commonly available conventional methods for detecting tracking errors, i.e., a deviation or misalignment between a beam axis of the photo-detecting device and an information recorded train on an information recorded disc, on which signals are optically recorded.

In the push-pull technique, as shown in FIG. 4, the light receiving surface of a light receiving element 1 that receives a laser beam reflected by the information recorded surface is divided into left and right halves. A difference between the light quantities received by the left and right halves is used to detect any tracking error.

In the heterodyne technique, as shown in FIG. 5, the light receiving surface of a light receiving element 2 is divided into four sections I, II, III, IV. A RF (Radio frequency) is obtained from the sum of the received light quantities on all surfaces I+II+III+IV. A HTD (heterodyne) signal is produced from the difference of the two summations of received light quantities on two diagonally disposed surfaces I+III and II+IV, and the phase difference between the RF and HTD signals is detected by the heterodyne detection to obtain a tracking error signal.

In the above-mentioned push-pull method, when a deviation $\Delta x$ occurs between the axis of a laser beam radiated against a disc 3 and an objective lens 4 that focuses the laser beam on the disc 3, as shown in FIG. 6, the amount of light received on one half of the light receiving element will increase $\Delta a$ while that on the other half will reduce $\Delta b$. This results in a dc offset $\Delta a + \Delta b$ being produced in the tracking error signal.

In common information recording discs in which information can be written optically, address information is generated at predetermined intervals and data can be written into unrecorded portions of the disc. When new information is written, the dc offset, if it exists, does not pose any problem. But it does pose a problem when the information is read from the disc.

SUMMARY OF THE INVENTION

The present invention has been accomplished with a view to overcoming the above drawback, and its objective is to provide a photo-detecting device, which uses a push-pull method to detect tracking errors during the process of recording information into the disc and, during the process of reading information from the disc, employs a heterodyne method for tracking error detection which is not affected by the problem of dc offset.

To achieve the above objective, the photo-detecting device of this invention has the light receiving surface of the light receiving element divided into sections at least by lines passing through the center of the surface which extend parallel to and perpendicular to the direction of tracking and which also run at an angle of 45 degrees to the first two lines. The tracking errors are detected by either a push-pull method or a heterodyne method. The push-pull method uses a pair of opposing, divided light receiving surfaces disposed in parallel with the direction of tracking, while the heterodyne method uses two pairs of opposing, divided surfaces disposed diagonally or at an angle of 45 degrees to the direction of tracking.

PREFERRED EMBODIMENT OF THE INVENTION

One embodiment of this invention will be described by referring to FIGS. 1 to 3.

Figure 1:
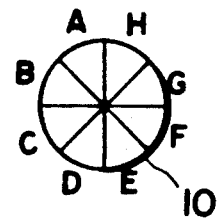
FIG. 1 is a front view of a light receiving element as one embodiment of this invention.

FIG. 1 shows one embodiment of a light receiving element 10, which is divided into eight sections A-H by lines that pass through the element's center and run parallel to and perpendicular to the tracking direction and that also run at an angle of 45 degrees to the direction of tracking.

Figure 2:
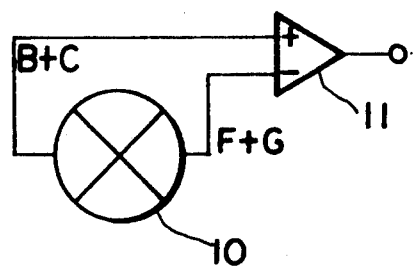
FIG. 2 is a circuit diagram including the light receiving element used for the push-pull method.

Of these eight light receiving sections, B, C, F and G sections (also referred to as subsections) are combined into B+C and F+G, as shown in the push-pull detection circuit of FIG. 2, so that these two combined light receiving surfaces are symmetrical with respect to the line perpendicular to the direction of tracking. The outputs of B+C and F+G are supplied to a differential amplifier 11, which produces a difference between the light quantities received at the divided light receiving surfaces on the left and right. This differential signal represents a tracking error. The tracking error signal includes a dc offset caused by the deviation $\Delta x$ of the objective lens from the beam axis.

In this invention, however, the push-pull method is used only during the process of recording signals. If the recorded signal train is deviated from the correct position due to the dc offset, no problem arise because when the signal is reproduced, adjustment is made of the beam axis according to the tracking error signal.

The divided sections (also referred to as subsections) of the light receiving element 10 is combined into the following four sections: A+B, C+D, E+F and G+H. These four sections are divided along lines extending parallel to and perpendicular to the direction of tracking, and are used for the heterodyne method of detecting the tracking error.

Figure 3:
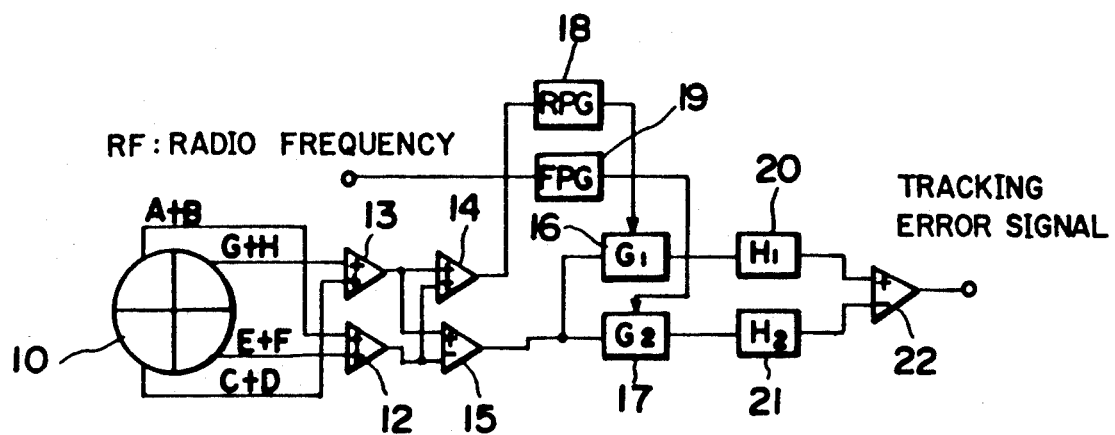
FIG. 3 is a circuit diagram including the light receiving element used for the heterodyne method.
Figure 4:
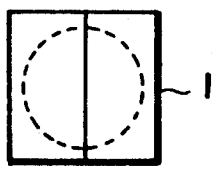
FIG. 4 is a front view of a conventional light receiving element used for the push-pull method.
Figure 5:
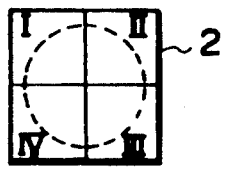
FIG. 5 is a front view of a conventional light receiving element used for the heterodyne method.
Figure 6:
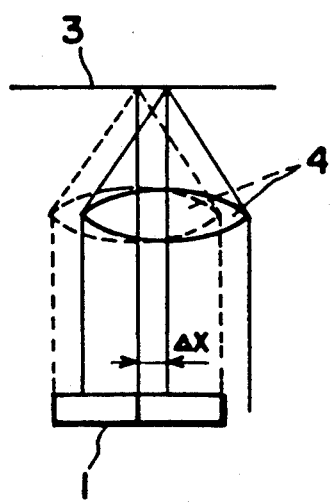
FIG. 6 is a schematic diagram showing the mechanism of generation of a dc offset.

That is, as shown in the heterodyne detection circuit of FIG. 3, the sections A+B and E+F are connected to an adder 12, the sections C+D and G+H are inputted to an adder 13, and the outputs of these adders 12, 13 are applied to an adder 14 and a differential amplifier 15. The output of the adder 14 represents the total amount of light received by all light receiving surfaces A-H and is thus used to detect an RF signal.

On the other hand, the differential amplifier 15 outputs the difference between the light quantities received by the light receiving surfaces A+B+E+F and C+D+G+H. The differential output is fed to two gate circuits 16, 17.

The output of the adder 14 is supplied to a rising pulse generating circuit (RPG) 18 and a falling pulse generating circuit (FPG) 19 to produce respective pulses. These rising and falling pulses open the gates of the gate circuits ($G_1$) 16, ($G_2$) 17 to feed the output of the differential amplifier 15 to hold circuits ($H_1$) 20, ($H_2$) 21 where it is retained.

The voltages held by the hold circuits 20, 21 are supplied to a differential amplifier 22 which outputs a difference between the two voltages as a tracking error signal.

Thus, the tracking error signal as detected by the heterodyne method is not affected by the dc offset which would be caused by the misalignment between the light axis and the objective lens. The heterodyne method of detecting the tracking errors is used for reproduction of general recorded signals and also for reproduction of prerecorded signals from the discs dedicated only for information reproduction, such as compact discs and video discs that cannot be written with new data.

In the discs which can be written with signals, the non-recorded portions reflect strong light while the recorded portions reflect weak light, so that the push-pull method and the heterodyne method are switched into operation alternately according to the light quantity received at the light receiving element 10 by a switching circuit (not shown).

While in the above embodiment the light receiving surface of the light receiving element 10 is divided into eight sections, it may be divided into any arbitrary number of sections as long as the object of this invention can be attained.

As mentioned above, by dividing the light receiving surface of the light receiving element into an appropriate number of sections and in appropriate directions, either the push-pull method or the heterodyne method can be used to detect tracking errors.

The push-pull method which would produce a dc offset is used to detect tracking errors only during the process of writing signals into the information recording disc. In recovering the recorded signals from the disc, the heterodyne method which does not produce the dc offset is used for detection of the tracking errors.

In optical discs that can be written with signals, taking advantage of the fact that grooved or recorded portions reflect weak light whereas unrecorded portions reflect strong light, the push-pull method and the heterodyne method can automatically be switched into operation alternately to detect the tracking error in such a way that the heterodyne method is used for the grooved or recorded portions and the push-pull method for the non-recorded portions.

What is claimed is:

1. A photo-detecting device of the type used with an optical system that uses a beam spot to record information on and read information from optical discs, said device comprising:

a light receiving element having a light receiving surface that receives said beam spot as reflected light from said disc surface, said light receiving surface having first and second sets of sections divided by first and second lines, said first and second lines passing through a center of the light receiving surface, wherein said first set of sections includes two pairs of opposing, divided light receiving surfaces disposed at a 45° angle to the tracking direction and said second set of sections includes a pair of opposing, divided sections which are disposed parallel with the tracking direction; and a detection circuit connected to said light receiving element and including:
a push-pull detection circuit connected to said second set of sections for identifying misalignment of said beam spot along a tracking direction, and
a heterodyne detection circuit connected to said first set of sections for identifying misalignment of said beam spot along a tracking direction, said detection circuit selectively and separately using each of said push-pull and heterodyne detection circuits based on an amount of light incident on said light receiving element.

2. The photo-detecting device of claim 1, wherein said push-pull detection circuit includes a first differential amplifier connected to opposing light receiving surfaces of said first pair, and said heterodyne detection circuit includes a second difference amplifier connected to opposing light receiving surfaces of said two pairs.

3. The photo-detecting device as in claim 1, further including a switching circuit which automatically switches control of said detection circuit between said push-pull circuit and said heterodyne circuit based on a total amount of light incident on said light receiving element.

4. The photo-detecting device as in claim 3, wherein said switching circuit compares said total amount of light to a reference level and switches control of said detection circuit to said push-pull circuit when said total light is above said reference level and switches control of said detection circuit to said heterodyne circuit when said total light is below said reference level.

5. The photo-detecting device as in claim 1, wherein said light receiving element includes at least eight subsections divided by said first and second lines, wherein said push-pull detection circuit is connected to four of said at least eight subsections and said heterodyne detection circuit is connected to all of said at least eight subsections.

6. The photo-detecting device as in claim 1, wherein the first set of sections is divided by first lines which run parallel and perpendicular to said tracking direction and the second set of sections is divided by second lines which run at a 45° angle to said first lines.

* * * * *